Feb. 7, 1967   H. H. SENTER   3,302,988
SHAFT BEARING WITH REMOVABLE BEARING INSERT
Filed Dec. 17, 1963
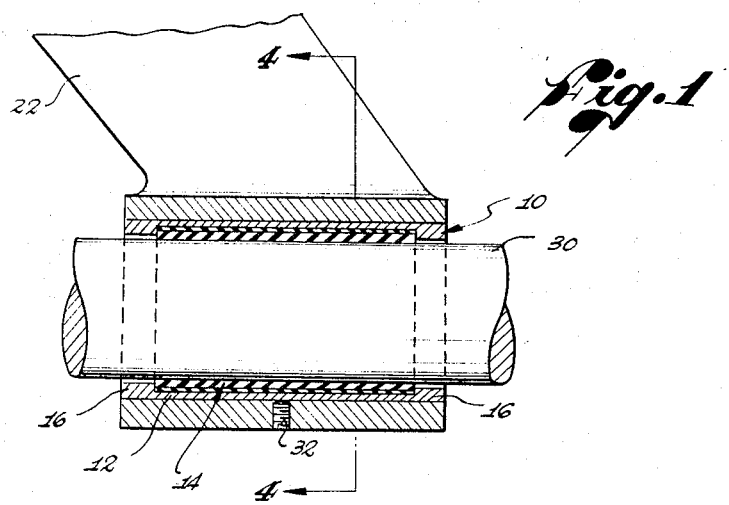
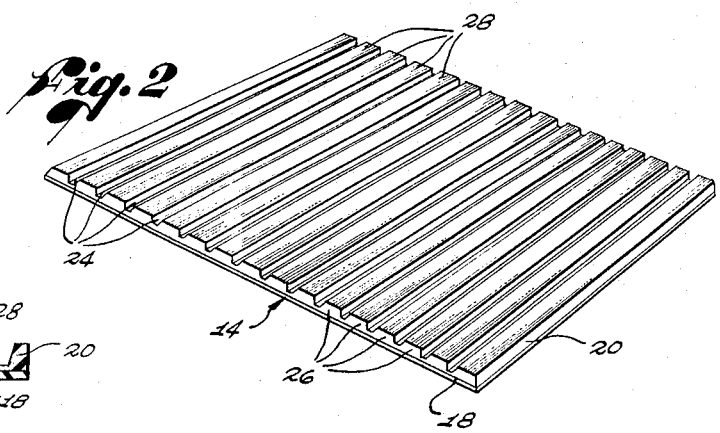
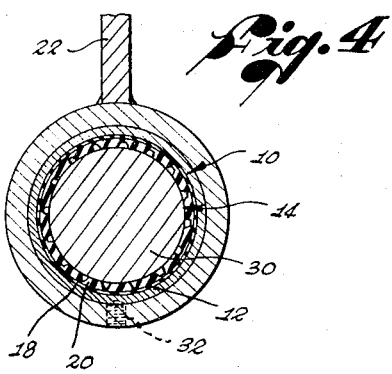
INVENTOR.
HAROLD H. SENTER
BY Forrest J. Lilly
ATTORNEY

United States Patent Office 3,302,988
Patented Feb. 7, 1967

3,302,988
SHAFT BEARING WITH REMOVABLE
BEARING INSERT
Harold H. Senter, Los Angeles, Calif., assignor to Plastic and Rubber Products Company, Los Angeles, Calif., a corporation of California
Filed Dec. 17, 1963, Ser. No. 331,136
2 Claims. (Cl. 308—238)

This invention relates generally to anti-friction bearings and, more particularly, to improvements in shaft bearings.

The bearing of this invention belongs to the general class of bearings which are especially, though not exclusively, designed for marine use. Bearings of the type referred to here, for example, are commonly used to rotatably support the propeller shaft of a marine vessel. One of the most widely used marine bearings of this class consists of a metal supporting sleeve and a rubber liner or insert within the sleeve. The inner surface of the insert is generally formed with a multiplicity of circumferentially spaced, longitudinally extending grooves defining therebetween raised lands having inwardly presented bearing surfaces for the propeller shaft. The bearing is typically removably fixed within a propeller shaft opening in the shaft supporting strut or other submerged part of the vessel, such that the bearing operates submerged in water which provides the necessary bearing lubricant.

One of the major problems encountered in all marine bearings is defacing and wear of the propeller shaft and/or bearing surfaces owing to the entrance of solid particles, such as sand and grit, between the shaft and bearing surfaces. This problem is aggravated if such particles become entrapped in the bearing and thereby exert a continuous abrading action on the shaft and bearing surfaces. It is to minimize this abrading action that the most widely used marine bearings employ resilient bearing liners or inserts, and particularly axially grooved resilient inserts which permit sand and grit particles to be continuously washed from the bearings. Thus, any particles which enter between the propeller shaft and the bearing surfaces on the spaced lands of the insert tend to be carried around by the rotating propeller shaft into the longitudinal grooves between the lands. The particles are then washed from the bearing by flow of water through the grooves.

From the standpoint of wear and abrasion, then, the existing marine bearings with resilient bearing inserts, and particularly those bearings in which the inserts are axially grooved, as discussed above, are quite satisfactory. All the existing marine bearings of this type of which I am aware, however, are subject to a major disadvantage residing in the fact that the rubber bearing insert is bonded directly to its metal supporting sleeve. As a result, reconditioning of the existing bearings is relatively costly since it involves replacement of both the rubber bearing insert and its metal supporting sleeve or tedious and time consuming removal of the bonded insert from the sleeve.

Copending application Serial No. 283,818, filed May 28, 1963, and entitled, Shaft Bearing and Replaceable Bearing Insert Therefor, discloses a marine bearing of improved design which avoids the foregoing disadvantages of the existing bearings. In this improved bearing, the rubber bearing insert is removably fixed in its metal supporting sleeve. The insert has a laminated construction and is composed of an outer backing layer which engages the inner surface of the metal supporting sleeve and an inner bearing layer which engages the shaft. The backing layer comprises a rubber composition having a coefficient of friction against the metal supporting sleeve which is relatively high compared to the operating coefficient of friction of the inner bearing layer against the supported shaft, so that the insert is restrained against turning in the sleeve during rotation of the shaft. The inner bearing layer comprises a low friction bearing material, such as Teflon, whereby the shaft can turn easily in the bearing.

Accordingly, the bearing disclosed in copending application Serial No. 283,818 is an improvement on the earlier bearings of this general type because the bearing can be easily and economically reconditioned by simply replacing the resilient bearing liner or insert. The bearing of said copending application, however, is deficient in that Teflon, which is typically employed therein as the low friction bearing material, has an extremely low coefficient of heat transfer. As a result, the Teflon bearing layer prevents rapid dissipation of the heat of friction generated by rotation of the supported shaft in the bearing. The prior bearing is thus prone to overheating.

A general object of this invention is to provide an improved bearing of the type described which possesses all of the advantages of the bearing disclosed in copending application Serial No. 283,818 but which is not subject to overheating.

Other objects, advantages, and features of the invention will become readily evident to those skilled in the art as the description proceeds.

Briefly, the objects of the invention are attained by providing a bearing of the class described wherein the removable bearing insert has a laminated construction and is composed of an outer backing layer and an inner bearing layer. The outer backing layer has a relatively high coefficient of friction against the metal supporting sleeve of the bearing, whereby the insert is restrained against turning in the sleeve during rotation of the supported shaft in the bearing. The inner bearing layer of the insert has a relatively low operating coefficient of friction against the propeller shaft, whereby the latter is journaled for relatively free rotation in the bearing. In contrast to the bearing of copending application Serial No. 283,818, however, both the inner and outer laminations or layers of the present bearing comprise rubber which has a substantially higher coefficient of heat transfer than the Teflon bearing material employed in the bearing of the copending application. Accordingly, heat retention and overheating are avoided in the present bearing.

The two layers or laminations of the bearing insert employed in the present improved bearing are afforded with the desired properties by employing rubber materials having different predetermined hardnesses. The backing layer of the insert, for example, is relatively soft and compliant and thus has a high coefficient of friction against the metal supporting sleeve. The inner bearing layer of the insert, on the other hand, is relatively hard and thus has a low coefficient of friction against the propeller shaft when the bearing is submerged in water. The backing layer of the insert, being relatively soft and spongy, is made relatively thin so that the harder, and thereby firmer, inner bearing layer of the insert forms the major thickness of the insert. In this way, the insert is provided with the required compressive stiffness to properly journal a marine propeller shaft. The compressive stiffness or rigidity of the insert as a whole supports a shaft radially so that the dynamic loads of the shaft on the bearing do not compress the bearing sufficiently to deflect or misalign the shaft. The relatively thick bearing layer of the insert is preferably axially grooved, in the manner of the earlier marine bearings of this type, to facilitate washing of particles of sand and grit from the bearing, as described earlier.

The invention will be best understood from the following detailed description of a presently preferred embodiment thereof, taken in connection with the annexed drawing, wherein:

FIG. 1 is an axial section through a marine shaft bearing according to the invention;

FIG. 2 is a perspective view of the bearing insert employed in the bearing of FIG. 1, the insert being laid out flat for the sake of clarity;

FIG. 3 is an enlarged section through a portion of the bearing insert in FIG. 2; and FIG. 4 is a section taken on line 4—4 in FIG. 1.

The bearing 10 illustrated in this drawing comprises, generally, an outer rigid bearing support or sleeve 12 and an inner removable bearing insert 14. Insert 14 is confined between the internal shoulders 16 in the ends of the sleeve 12 and is of flexible rubber construction, as mentioned earlier and described in greater detail later, so that the insert may be easily inserted into and withdrawn from the metal supporting sleeve 12.

Referring to FIGS. 2 and 3, bearing insert 14 will be seen to comprise a rectangular laminated rubber sheet-like body including a relatively thin backing layer or lamination 18 and a relatively thick bearing layer or lamination 20 bonded to one side of the backing layer. In the present bearing, both layers or laminations 18 and 20 of the insert are composed of rubber, the backing layer 18 being a relatively soft and spongy rubber and the bearing layer 20 being a relatively hard and firm rubber. The reasons for employing two different types of rubber in the bearing insert will be explained shortly. Suffice it to say at this point that in a typical bearing according to the invention, having a diameter of one to two inches, the backing layer 18 is on the order of 0.020 inch in thickness and has a Shore hardness on the order of 40-50. The inner bearing layer 20, on the other hand, is on the order of 0.125 inch in thickness and has a Shore hardness on the order of 70-80.

As noted earlier, the present bearing 10 is designed particularly, though not exclusively, for use as a marine bearing and is intended to operate submerged in water, whereby the latter acts as a lubricant for the bearing. In FIG. 1, for example, the bearing is shown as being installed in the lower submerged end of the propeller shaft supporting strut 22 of a marine vessel. In accordance with the earlier explained practice in marine bearings of this type, the bearing insert 14 is formed with grooves 24 extending parallel to the axis of the metal supporting sleeve 12. These grooves define therebetween raised lands 26 having surfaces 28 which, in the completed bearing, provide bearing surfaces for the shaft 30 supported in the bearing.

In use, the sheet-like insert body is rolled into a cylinder having its axis extending parallel to the grooves 24 to form a bearing insert 14 having a laminated, generally cylindrical wall, after which the insert is introduced axially into the metal supporting sleeve 12. The insert is so proportioned that when thus inserted into the metal sleeve 12, the opposing end edges of the insert which parallel the grooves 24 are disposed in close proximity or abut one another, as shown in FIG. 4. The dimension of the insert axially of the sleeve 12 is just slightly less than the axial spacing between the sleeve shoulders 16, whereby the insert is closely axially confined between the shoulders.

As noted earlier, bearing 10, when used as a marine bearing, is typically installed in the propeller shaft supporting strut 22 of a marine vessel, as shown. The bearing is releasably fixed in the strut opening in any convenient way, as by a set screw 32, whereby the bearing may be removed for repair, when desired, by withdrawing the propeller shaft 30 from the bearing and then withdrawing the bearing from the strut. When the bearing is installed on a vessel, as described, the propeller shaft 30 of the vessel extends through the bearing and is rotatably supported by the bearing surfaces 28 on the lands 26 of the bearing insert 14. As already noted, the present bearing is designed to operate submerged in water, whereby the latter lubricates the bearing. Any particles of sand or grit which enter between the propeller shaft 30 and the bearing surfaces 28 are carried around with the rotating shaft into the grooves 24 and are then washed from the bearing by water flowing through the grooves.

The present invention resides primarily in the construction of the cylindrical wall of the bearing insert 14. As noted, this wall is composed of a thin, soft rubber outer lamination or backing layer 18 and a thick, hard rubber inner lamination or bearing layer 20. This bearing insert construction is desirable for the following reasons:

As explained earlier, the bearing insert in a bearing of this general type, to be completely satisfactory, must satisfy several requirements. First, the insert must have an outer surface which possesses a high coefficient of friction against the outer metal supporting sleeve, such that the insert will remain stationary within the sleeve and not rotate with the propeller shaft. The inner bearing surfaces 28 of the insert 14, on the other hand, must have a low coefficient of friction against the propeller shaft 30 to permit the latter to rotate freely in the bearing and thereby minimize the power which is consumed in the bearing, the frictional drag of the shaft on the bearing insert which tends to cause the latter to turn in the metal supporting sleeve, and the heat generated in the bearing by the rotating shaft. Secondly, the wall of the insert must possess a relatively high overall coefficient of heat transfer or thermal conductivity in the radial direction such that the heat of friction which is generated by the rotating shaft will be rapidly transmitted or dissipated through the insert to the metal supporting sleeve and its supporting structure and then through the latter to the surrounding water. Finally, the bearing insert, while possessing a degree of resilient compliancy in order to minimize damage to the insert and shaft by grit particles in the bearing, as already explained, must possess sufficiently high overall compressive stiffness, i.e., high modulus of elasticity, to provide proper lateral or radial support for the shaft and prevent the latter from orbiting or vibrating in the bearing with minimum contact pressure, and hence friction, between the shaft and insert.

These several requirements are all uniquely satisfied by the present bearing insert 14.

Relative to the first stated requirement, the outer backing layer 18 of the insert, having a relatively low Shore hardness as it does, is quite spongy and porous so that the coefficient of friction of the backing layer against the inner surface of the metal supporting sleeve 12 is relatively high, as required to restrain the insert against turning in the sleeve. This coefficient of friction may be increased, if necessary, by sand blasting or otherwise roughening the internal sleeve surface. The inner bearing layer 20 of the insert, on the other hand, having a relatively high Shore hardness as it does, is relatively hard and smooth and thus has a relatively low coefficient of friction against the shaft 30, when submerged in water, as required to permit free rotation of the shaft in the bearing.

Relative to the second stated bearing requirement, both layers 18 and 20 of the present insert 14 are composed of rubber which has a relatively high coefficient of heat transfer or thermal conductivity, that is, relatively high as compared to plastic and other bearing materials, such as Teflon, for example. Moreover the hard rubber has higher thermal conductivity than the soft rubber. Accordingly, the insert has maximum overall thermal conductivity and is capable of dissipating the heat of friction generated in the bearing by the rotating shaft at a sufficiently high rate to prevent overheating of the bearing.

Finally, with regard to the third stated bearing requirement, the soft backing layer 18 of the bearing is relatively thin, so that the relatively hard bearing layer 20 has a thickness many times the thickness of the backing layer and forms the major thickness of the overall insert. The hardness of the bearing layer 20, and hence the effective overall compressive stiffness or modulus of elasticity of the insert, is sufficiently great or high to provide a rigid bearing support for the shaft, to prevent the latter from orbiting or vibrating in the bearing, with minimum contact pressure, and hence friction, between the shaft and insert. In this regard it is significant to note that if the soft rubber outer layer of the insert were relatively thick, this layer would have to be radially compressed a substantial amount to provide proper lateral support for the shaft, with a resultant increase in the contact pressure and hence friction between the shaft and insert and in the rate of wear of the insert.

Clearly, therefore, the invention herein described and illustrated is fully capable of attaining the several objects and advantages preliminarily set forth.

I claim:
1. The combination of:
    a revolving shaft exerting radially directed dynamic loads as a consequence of the rotation of the shaft;
    and a sleeve type bearing surrounding the shaft to support the shaft against deflection from said dynamic loads,
    said bearing including
        a rigid housing of cylindrical shape, and a laminated rubber bearing insert in the bearing housing in contact therewith and with the revolving shaft,
    said insert comprising a relatively thick bearing layer of relatively hard rubber having a low coefficient of friction against the shaft and sufficient rigidity to maintain the shaft aligned under the dynamic loads
    and a relatively thinner backing layer of rubber softer than said thicker layer having a high coefficient of friction to restrain the insert from turning with the shaft in the sleeve and of the order of .020 inch in thickness so that the dynamic loads do not deflect and misalign the shaft.

2. The combination as in claim 1 in which said backing layer has a Shore hardness on the order of 40–50 and said bearing layer has a Shore hardness on the order of 70–80.

References Cited by the Examiner

UNITED STATES PATENTS

| | | | |
|---|---|---|---|
| 242,409 | 5/1881 | Carroll | 308—238 X |
| 1,555,214 | 9/1925 | Johnson | 308—238 |
| 1,797,223 | 3/1931 | Annis | 308—238 |
| 1,817,774 | 8/1931 | Sipe. | |
| 1,845,858 | 2/1932 | Watson | 308—238 X |
| 1,895,936 | 1/1933 | Merrill | 308—238 |
| 2,324,083 | 7/1943 | Holmes | 308—238 X |
| 2,362,566 | 11/1944 | Lappert | 308—71 |
| 2,648,247 | 8/1953 | Schmuziger | 308—237 X |
| 2,675,283 | 6/1954 | Thomson. | |
| 2,851,316 | 9/1958 | Thomson | 308—230 |
| 2,857,214 | 10/1958 | Kogstrom | 308—71 |
| 2,898,165 | 8/1959 | Patton | 308—239 |
| 3,000,657 | 9/1961 | Boschi. | |
| 3,042,394 | 7/1962 | Bliss | 267—54 |
| 3,047,934 | 8/1962 | Magner | 308—238 X |
| 3,188,152 | 6/1965 | Miller | 308—238 X |

FOREIGN PATENTS

| | | |
|---|---|---|
| 1,227,604 | 8/1960 | France. |
| 838,843 | 5/1952 | Germany. |
| 585,892 | 3/1958 | Italy. |

OTHER REFERENCES

Rubber Age, Soft Rubber Bearings, N. J., Palmerton Publishing Company, 1917, volume 65, No. 2, May 1949 by A. Bednar TS 1870 R6 (pp. 173 to 179 relied on).

MARTIN P. SCHWADRON, *Primary Examiner.*

DON A. WAITE, DAVID J. WILLIAMOWSKY,
*Examiners.*

L. L. JOHNSON, *Assistant Examiner.*